Figure 4:
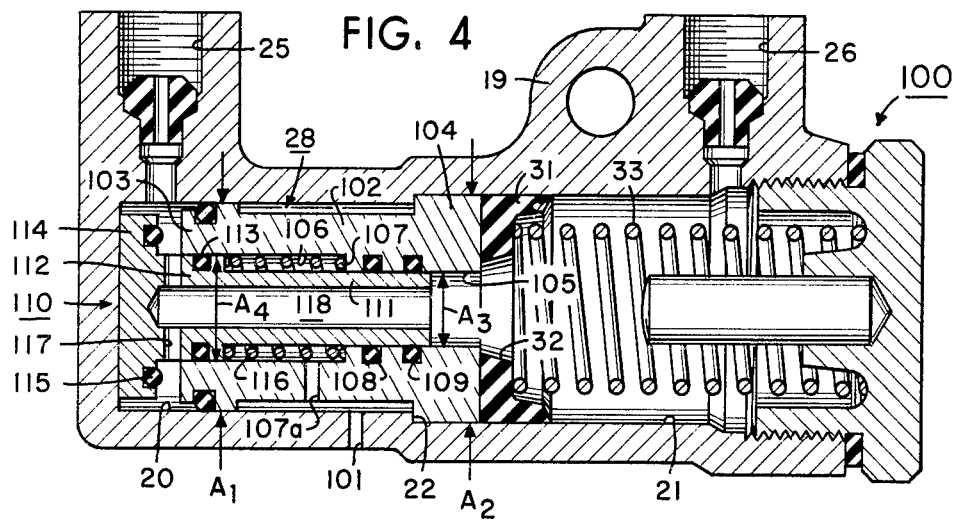

Feb. 1, 1966    R. J. KERSTING    3,232,057
RATIO CHANGER
Filed March 1, 1965    2 Sheets-Sheet 1
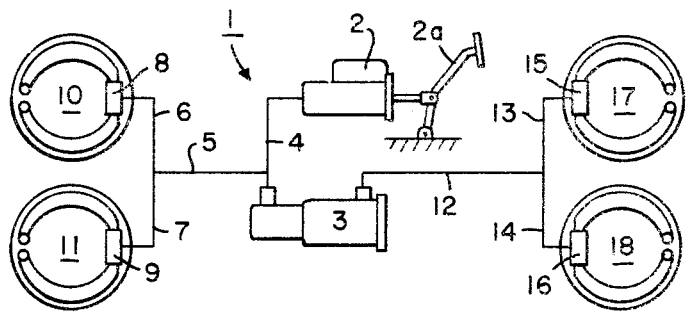
FIG. 1
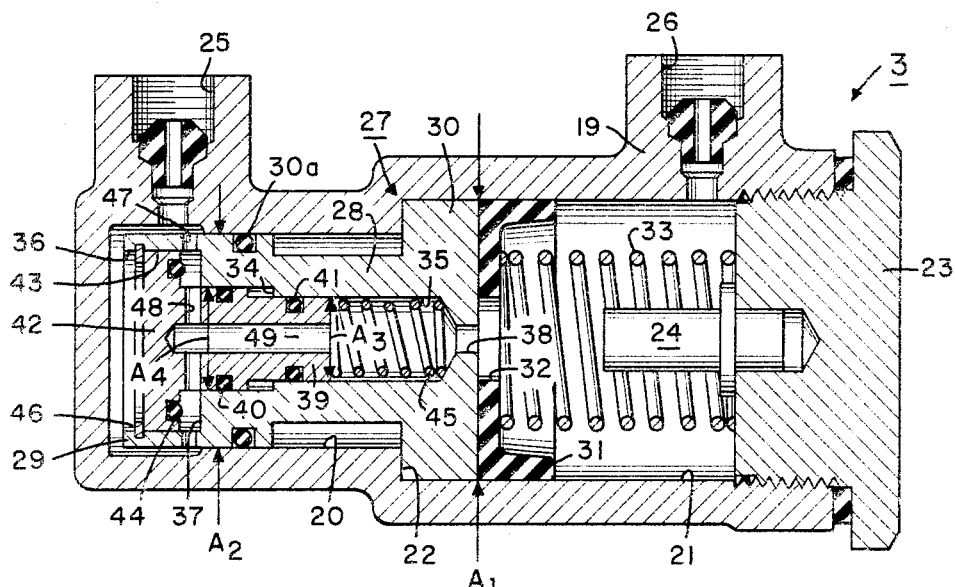
FIG. 2
FIG. 7
FIG. 3
INVENTOR
RAYMOND J. KERSTING
BY
Joseph E. Papin Feb. 1, 1966   R. J. KERSTING   3,232,057
RATIO CHANGER
Filed March 1, 1965   2 Sheets-Sheet 2

INVENTOR
RAYMOND J. KERSTING
BY Joseph E. Papin

United States Patent Office 3,232,057
Patented Feb. 1, 1966

3,232,057
RATIO CHANGER
Raymond J. Kersting, Dellwood, Mo., assignor to Wagner Electric Corporation, St. Louis, Mo., a corporation of Delaware
Filed Mar. 1, 1965, Ser. No. 435,968
10 Claims. (Cl. 60—54.5)

This invention relates to control valves and more particularly to a ratio changing valve in a vehicle brake system.

The object of the present invention is to provide a novel ratio changing valve in a vehicle braking system to effect more efficient utilization of braking effort.

Another object of the present invention is to provide a novel ratio changing valve for effecting a fluid pressure differential between vehicle front and rear brakes to compensate for inertial weight shift of the vehicle during vehicle deceleration in response to braking effort.

Another object of the present invention is to provide a ratio changing valve for effecting a fluid pressure differential between vehicle front and rear brakes so that greater braking force is provided at said front brakes to compensate for the increased load thereon due to the inertia-shift of weight to the front of the vehicle during deceleration and to obtain a more efficient utilization of braking effort between said front and rear brakes.

Another object of the present invention is to provide a novel ratio changing valve in a vehicle braking system which initially permits substantially simultaneous fluid pressure actuation of the vehicle front and rear brakes, and upon the establishment of predetermined fluid pressure thereafter provides a proportional fluid pressure differential between said front and rear brakes.

Another object of the present invention is to provide ratio changing valve means for controlling fluid pressure applied to front and rear vehicle brakes and having a pair of differential valve members therein respectively responsive to the fluid pressure applied to said front and rear brakes, one of said valve members being responsive to a predeterminately applied fluid pressure to interrupt pressure fluid communication between said brakes and the other of said valve members being thereafter movable in response to another predetermined fluid pressure in excess of the first named predetermined fluid pressure to change the ratio between the fluid pressures at said front and rear brakes.

Another object is to provide a ratio changing valve which contains a ratio changing piston having opposed differential ends in constant pressure fluid communication with the inlet and outlet ports of said ratio changing valve, said piston being ineffective to establish a fluid pressure ratio change between front and rear vehicle brakes until a differential valve member also responsive to fluid pressure at said inlet and outlet ports and movable in a passageway through the said piston is automatically moved to a position sealing said passageway.

Still another object of the present invention is to provide a ratio changing valve of simplified construction for economy of manufacture.

These and other objects and advantages will become apparent hereinafter.

Briefly, the present invention comprises a ratio changing valve having a pair of ports therein and a pair of differential valve members controlling pressure fluid communication between said ports, one of said valve members being responsive to a predetermined fluid pressure at said ports to interrupt pressure fluid communication therebetween and the other of said valve members being thereafter movable in response to fluid pressure at one of said ports predeterminately greater than said predetermined fluid pressure to proportionally increase the fluid pressure at the other of said ports.

Figure 5:
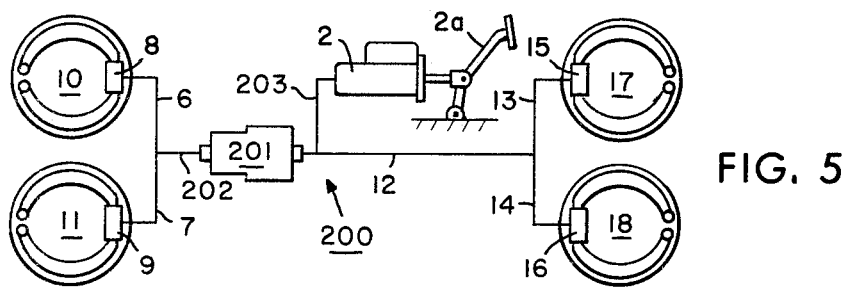
Figure 6:
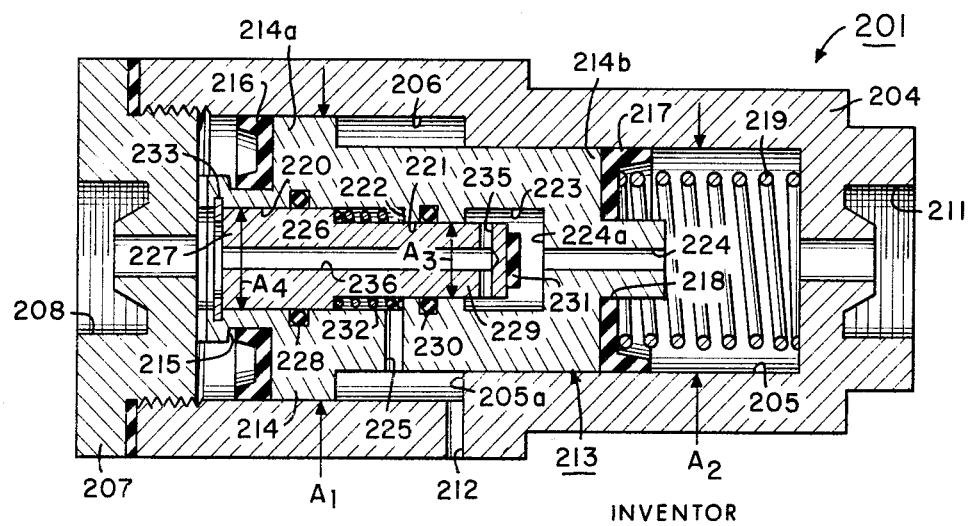

In the drawings which illustrate embodiments of the present invention,

FIG. 1 is a diagrammatic view of a fluid pressure system having a control valve therein embodying the present invention, FIG. 2 is a sectional view showing the control valve of FIG. 1 in cross-section, FIG. 3 is a graphical representation of the brake pressure as effected by the control valve, FIG. 4 is a sectional view showing another embodiment of the present invention, FIG. 5 is a diagrammatic view of a fluid pressure system having a control valve therein illustrating another embodiment of the present invention, FIG. 6 is a sectional view showing the control valve of FIG. 5 in cross-section, and FIG. 7 is a graphical representation of the brake pressure as effected by the embodiment of the control valve as shown in FIG. 6.

Referring to the drawings in detail and in particular to FIG. 1, a fluid pressure system 1 is provided with fluid pressure generating means or a master cylinder 2 connected with the inlet port of a control or ratio changing valve 3 by a conduit 4, and another conduit 5 has one end intersecting with the conduit 4 while the other end thereof branches at 6, 7, said branches being connected with servo motors or wheel cylinders 8, 9 of the usual front wheel brake assemblies 10, 11. Another conduit 12 has one end connected with the outlet port of the ratio changing valve 3 while the other end thereof branches at 13, 14 to connect with the usual servo motors or wheel cylinders 15, 16 of rear brake assemblies 17, 18.

Referring now to FIG. 2, the ratio changing valve 3 is provided with a housing 19 having an axially aligned bore and counterbore 20, 21 therein, and a radial shoulder 22 is provided at the intersection of said bore and counterbore. The leftward end of the bore 20 is closed by the housing 19, and the rightward end of the counterbore 21 is closed by a plug member 23 threadedly received therein, said plug member including an abutment or stop 24 which extends coaxially into the counterbore 21. An inlet port 25 which receives the conduit 4, as previously mentioned, is provided in the housing 19 connecting with the bore 20 adjacent the leftward end thereof, and an outlet port 26 which receives the conduit 12, as previously mentioned, is also provided in the housing 19 intersecting the counterbore 21 adjacent the rightward end thereof.

A control or ratio changing piston, indicated generally at 27, is provided with a stepped body portion 28 having opposed ends 29, 30 which are slidably received in the bore and counterbore 20, 21, respectively, and the rightward or larger end 30 is provided with an effective fluid pressure responsive area $A_1$ proportionally greater than the effective fluid responsive area $A_2$ provided on the leftward or smaller end 29. A sealing cup 31 having a centrally located aperture 32 therein is sealably engaged between the larger piston end 30 and the housing counterbore 21, and a peripheral seal 30a is provided on the piston body 28 adjacent the smaller end 29 thereof in sealing engagement with the housing bore 20. A return spring 33 is biased between the housing plug member 23 and the sealing cup 31 normally urging the larger piston end 30 into abutting engagement with the housing shoulder 22. Stepped bores 34, 35 are axially provided in the piston body 28, and a counterbore 36 connects with the leftward end of the larger stepped bore 34 providing an annular shoulder or valve seat 37 at the juncture thereof. Another aperture 38 is provided through the rightward end 30 of the piston body 28 connecting with the smaller of the stepped bores 35 and being substantially coaxial with the aperture 32 in the sealing cup 31.

A valve member 39 is slidably received in the piston stepped bores 34, 35, and peripheral seals 40, 41 are carried by said valve member in sealing engagement with the said stepped bores, respectively. An enlarged valve head 42 is integrally provided on the valve member 39 having a peripheral portion 43 slidable in the piston counterbore 36, and an annular seal 44 is carried in said valve head adjacent said peripheral portion thereof for sealing engagement with the piston valve seat 37. A spring 45 is interposed between the rightward end of the smaller stepped bore 35 of the piston body 28 and the valve member 39 normally urging said valve member leftwardly to abuttingly engage the valve head 42 with a snap ring and groove assembly 46 provided in the piston counterbore 36 adjacent the leftward end thereof and normally urging the valve head seal 44 away from the cooperating valve seat 37 on the piston body 28. A plurality of radially extending passages 47 is provided in the piston body 28 connecting with the piston body counterbore 36 adjacent the valve seat 37, and a plurality of cross-passages 48 is provided in the valve member 39 adjacent the head 42 thereof, said cross-passages intersecting with a centrally located passage 49 which extends through the rightward end of said valve member. It should be noted that the rightward end of the valve member 39 slidable in the smaller piston stepped bore 35 is provided with an effective fluid pressure responsive area $A_3$ which is proportionally less than an opposing effective fluid pressure responsive area $A_4$ provided on the portion of said valve member which is slidable in the larger piston stepped bore 34.

In the operation with the component parts of the ratio changer 3 in their normal positions as shown in FIG. 2 and as described hereinabove, a manually applied force on the brake pedal 2a displaces pressure fluid from the master cylinder 2 through the conduits 4, 5, 6 and 7 into the wheel cylinders 8, 9 to initially energize the front wheel brake assemblies 10, 11. The displaced pressure fluid also flows from the conduit 4 through the inlet port 25 of the ratio changing valve 3 into the housing bore 20 and therefrom through the piston body radial passages 47, the piston counterbore 36 or the chamber formed between valve head 42 and piston valve seat 37, the radial passages 48 and 49 of the valve 39, the piston body smaller stepped bore 35 and aperture 38, and the aperture 32 of the sealing cup 31 into the counterbore 21. The displaced pressure fluid flows from the counterbore 21 through outlet port 26 and conduits 12, 13 and 14 into the wheel cylinders 15, 16 to initially energize the rear wheel brake assemblies 17, 18 in a time sequence substantially simultaneous with the aforementioned initial energization of the front wheel brake assemblies 10, 11. During this initial energization, the fluid pressure of the displaced pressure fluid at the front and rear wheel brake assemblies 10, 11 and 17, 18 is substantially equal. It should be noted that since the area $A_1$ is greater than the area $A_2$, the piston body 28 is urged toward engagement with the housing shoulder 22 when the fluid pressure on the piston body ends 29, 30 is equal.

The displaced fluid pressure acts on the larger effective area $A_4$ of the valve member 39 to establish a force $F_1$ and also acts on the smaller area $A_3$ of said valve member to establish another force $F_2$ in opposition to the force $F_1$ across the valve member 39. When the displaced pressure fluid attains a predetermined value P, the magnitude of the force $F_1$ overcomes that of the force $F_2$ plus the additive compressive force $Fcr$ of the valve spring 45 thereby serving to move the valve member 39 rightwardly in the piston body bores 34, 35 and counterbore 36 to sealably engage the valve head seal 44 with the valve seat 37 interrupting pressure fluid communication through the piston 27 between the inlet and outlet ports 25, 26 of the ratio changing valve 3.

When the valve element 44 is engaged with the valve seat 37 to interrupt pressure fluid flow through the piston 27, the input fluid pressure $Pi$ at the inlet port 25 acts on the smaller effective area $A_2$ of the piston 27 to establish an input force $Fi$ in opposition to an output force $Fo$ established by the output fluid pressure $Po$ at the outlet port 26 acting on the larger effective area $A_1$ of said piston. When the input fluid pressure $Pi$ is increased to a predetermined value T, wherein the magnitude of the input force $Fi$ exceeds that of the magnitude of the output force $Fo$ plus the compressive force $Fcr$ of the return spring 33, the piston 27 and valve member 39 are concertly moved rightwardly in the housing bore and counterbore 20, 21 in pressure fluid displacing direction to thereafter increase the output fluid pressure $Po$ delivered to the rear braking assemblies in a ratio to the input fluid pressure $Pi$, as shown by the formula:

$$Po = \frac{Pi(A_2) - Fcr}{A_1}$$

As illustrated by the graphical representation of braking pressure in FIG. 3, until the displaced pressure fluid attains the predetermined value P, the output fluid pressure $Po$ from the ratio changer 3 to the rear wheel brake assemblies 17, 18 is in direct proportion, i.e. a 1:1 ratio, to the input fluid pressure $Pi$, as shown by the line OP. This predetermined fluid pressure P is equivalent to the fluid pressure required to overcome the inherent resistances of the system 1 and to move the brake shoes into initial engagement with the brake drums. When the predetermined fluid pressure P is attained, the valve member 39 sealably engages the valve seat 37 to interrupt fluid communication between inlet and outlet ports 25, 26 and effect the ratio change between the input and output fluid pressures $Pi$ and $Po$, as described hereinabove; however, the output fluid pressure $Po$ to the rear wheel brake assemblies 17, 18 remains substantially constant, as shown by the line PT, while the input fluid pressure $Pi$ is increased, as illustrated by the line PQ. Upon $Pi$ attaining the predetermined fluid pressure Q, the input force $Fi$ attains a magnitude substantially equal to the output force $Fo$ plus the compressive force $Fcr$ of the return spring 33 and thereafter any increase in the input fluid pressure $Pi$, as illustrated by the line QS, to the ratio changer 3 will result in a proportional increase in the output fluid pressure $Po$, as illustrated by the line TU, in the ratio of the formula described hereinabove. In this manner, the ratio changer 3 effects a predetermined ratio between the input and output fluid pressures $Pi$ and $Po$ so that the fluid pressure at the front wheel brakes above the predetermined value P is proportionally greater than that at the rear wheel brakes; therefore, the front wheel brakes are capable of applying a greater braking force to counteract the inertia shift of automobile weight to the front of the car during a braking application.

When the desired braking effect is obtained, the manually applied force is removed from the brake pedal 2a, and the inlet fluid pressure $Pi$ is thereby so diminished that the front wheel brake assemblies are de-energized and the input forces $Fi$ and $F_1$ in the ratio changer 3 are eliminated. Therefore, the output force $Fo$ and the compressive force $Fcr$ of the return spring 33 urge the piston member 27 leftwardly into abutting engagement with the radial shoulder 22 of the housing 19. Also the force $F_2$ and the compressive force $Fcr$ of the return spring 45 urge the valve member 39 leftwardly toward its original position in abutting engagement with the snap ring 46 thereby permitting return pressure fluid flow between the inlet and outlet ports 25, 26 to de-energize the rear wheel brake assemblies 17, 18.

Referring now to FIG. 4, a control valve 100 shown therein is provided with substantially the same component parts and functions in the system 1 in substantially the same manner as the previously described control valve 3 with the following exceptions.

The housing 19 is provided with a venting passage 101 which intersects the bore 20 adjacent the shoulder 22. A stepped piston body or valve member 102 is slidable in the housing bore and counterbore 20, 21 between the inlet and outlet ports 25, 26 and is provided with opposed end portions 103, 104 having opposed effective fluid pressure responsive areas $A_1$, $A_2$, said area $A_1$ of the smaller end 103 being predeterminately less than said area $A_2$ of the larger end 104. Axially stepped bores 105, 106 are provided through the piston member 102 defining a radial shoulder 107 at the junction thereof, and axially spaced seals 108, 109 are disposed in the smaller stepped bore 105 adjacent said shoulder 107. A venting passage 107a is also radially provided through piston body 28 intersecting the larger stepped bore 106 adjacent the shoulder 107.

A stepped valve member, indicated generally at 110, is provided with a reduced or valve stem portion 111 slidably received in the piston smaller stepped bore 105 in sealable engagement with the seals 108, 109, and an intermediate or valve body portion 112 is slidably received in the piston larger stepped bore 106, said intermediate valve body carrying a peripheral seal 113 therein in sealing engagement with said piston larger stepped bore. An enlarged valve head 114 is integrally formed on the leftward end of the intermediate valve body 112, and an annular seal 115 is carried in said valve head adjacent the peripheral portion thereof for sealing engagement with the piston end 103, which forms an annular valve seat about the piston larger stepped bore 106. A valve spring 116 is concentric with the periphery of the valve stem 111 and biased between the piston radial shoulder 107 and the intermediate valve body 112 normally urging the valve head 114 into abutting engagement with the leftward end of housing bore 20. The chamber formed between valve stem 111 and the piston larger stepped bore 106 is vented to the atmosphere through the passage 107a, the peripheral chamber between piston member 102 and housing bore 20 and the housing vent passageway 101 to obviate damping. It should be noted that the valve stem 111 has an effective fluid pressure responsive area $A_3$ which is proportionally smaller than the opposing effective fluid pressure responsive area $A_4$ of the intermediate valve body portion 112. A plurality of radially extending cross-passages 117 are provided in the valve member 110 adjacent the enlarged valve head 114 thereof and connect with an axial passage 118 which extends through the rightward end of the said valve member. The seal 31 is sealably engaged between the piston larger end 104 and the housing counterbore 21 with the aperture 32 thereof substantially in axial alignment with the piston smaller stepped bore 105, and the return spring 33 normally urges said seal into abutment with said piston larger end while also normally urging said piston larger end into abutment with the housing shoulder 22.

Referring now to FIG. 5, a fluid pressure system 200 is provided with substantially the same component parts and functions in substantially the same manner as the previously described system 1 with the following exceptions. The system 200 is provided with a control or ratio changer valve 201, the outlet port of which is connected with branch conduits 6, 7 by a conduit 202 while the inlet port thereof connects with the conduit 12. To complete the description of system 200, a delivery conduit 203 has one end connecting with the master cylinder 2 while the other end thereof connects with the conduit 12.

Referring now to FIG. 6, the control valve 201 is provided with a housing 204 having an axially aligned bore and counterbore 205, 206 therein defining a radial shoulder 205a. The counterbore 206 extends through the leftward end of housing 204 and is closed by means of plug 207 which is threadedly received in said counterbore, and an inlet port 208 which receives the conduit 12, as previously mentioned, is provided in said plug in communication with said counterbore, and an outlet port 211 which receives the conduit 203, as previously mentioned, is provided in the housing 204 connecting with the housing bore 205, and a venting passage 212 intersects the counterbore 206 adjacent to the radial shoulder 205a.

A piston or valve member 213 is provided with a stepped body portion 214 which is slidably received in the housing bore and counterbore 205, 206, said body portion having opposed ends 214a and 214b. A circumferential groove 215 is provided in the leftward or larger piston end 214a, and a sealing cup 216 is positioned in said groove in sealing engagement between said larger piston end and the counterbore 206. It should be noted that the leftward piston end 214a has an effective fluid pressure responsive area $A_1$ which is proportionally larger than the effective fluid pressure responsive area $A_2$ of the smaller piston end 214b. A sealing cup 217 having an aperture 218 therein is sealably engaged between the smaller piston end 214b and the bore 205, and a return spring 219 is biased between the said sealing cup and the rightward end of the housing bore 205 urging the piston 213 leftwardly so that the larger or leftward piston end 214a is normally in abutting engagement with the plug 207.

The piston 213 is provided with axial stepped bores 220, 221 which form a radial shoulder 222 therebetween, and seals 228 and 230 are respectively disposed in said stepped bores adjacent to the mid-portions thereof. An undercut 223 connects with the rightward end of the smaller stepped bore 221, and another aperture 224 is provided through the rightward end 214 of piston body 213 connecting with said undercut to form an annular valve seat 224a at the juncture therebetween. A radially extending venting passageway 225 is provided through the piston body 213 and intersects the piston stepped bore 220 adjacent to the radial shoulder 222.

A stepped valve member 226 is provided with a large body portion 227 which is slidably received in piston stepped bore 220 in sealable engagement with the seal 228 and a smaller valve body portion 229 which is slidably received in the piston stepped bore 221 in sealable engagement with the seal 230, said smaller valve body portion extending coaxially into the undercut 223. A resilient valve or seal 231 is fixedly connected to the terminal or free end of the smaller valve body portion 229 for sealing engagement with valve seat 224a, and a valve spring 232 is biased between the piston radial shoulder 222 and the larger valve body 227 normally urging the valve member 226 leftwardly into abutting engagement with a groove and stop ring assembly 233 provided adjacent the leftward end of the piston larger stepped bore 220 and normally spacing the valve seal 231 from the piston valve seat 224a. A plurality of radially extending cross-passages 235 are provided adjacent to the rightward end of the valve member 226 connecting with the undercut 223 and intersecting with an axial passageway 236 which extends leftwardly through the said valve member. To complete the description of the ratio changing valve, it should be noted that the rightward end 229 of the valve member 226 has an effective fluid pressure responsive area $A_3$ which is proportionally smaller than and opposed to the effective fluid pressure responsive area $A_4$ of the larger end 227 of the said valve member.

In the operation of the control valve 201, a manually applied force on the brake pedal 2a displaces pressure fluid from the master cylinder 2 through conduits 203, 12, 13 and 14 into wheel cylinders 15, 16 to initially energize the rear wheel brake assemblies 17, 18. The displaced pressure fluid also flows from the conduit 12 through the inlet port 208 of the control valve 201, the housing counterbore 206 and the valve passage and cross-passages 236, 235 into the piston undercut 223 and therefrom through the piston aperture 224, the sealing cup aperture 218, the housing bore 205 and outlet port 211, and conduits 202, 6, 7 into wheel cylinders 8, 9 to initially effect the energization of the front wheel brake assemblies 10, 11 substantially simultaneous with the energization of the rear wheel brake assemblies 17, 18.

The displaced fluid pressure acts on the large area $A_4$ of valve member 226 to develop a force $F_4$ and also acts on the proportionally smaller area $A_3$ of the said valve member to develop an opposing force $F_3$ across the said valve member. When the predetermined fluid pressure P is attained, the force $F_4$ overcomes the opposing force $F_3$ plus the additive compressive force $Fcr$ of the spring 232 to urge the valve member 226 rightwardly until the valve 231 engages the valve seat 224a to close the passage 224 and interrupt pressure fluid flow between inlet and outlet ports 208, 211. When the valve 231 sealably engages the valve seat 224a, the input fluid pressure $Pi$ to the control valve 201 acts on the large area $A_1$ of the piston member 213 to develop a force $F_1$ in opposition to a force $F_2$ developed by the output fluid pressure $Po$ acting on the proportionally smaller area $A_2$ of the said piston. When the input fluid pressure $Pi$ attains the predetermined fluid pressure L, the force $F_1$ overcomes the opposing force $F_2$ plus the additive compressive force $Fcr$ of spring 219, thereby urging the piston 213 rightwardly to displace pressure fluid from the housing bore 205 to further energize the front brakes. Since the area $A_2$ is proportionally smaller than area $A_1$, the output fluid pressure $Po$ to the front wheel brake assemblies 10, 11 is proportionally increased with respect to the $Pi$ as shown by the formula:

$$Po = \frac{PiA_1 Fcr\ 219}{A_2}$$

As illustrated by the graphical representation of braking pressure in FIG. 7, the control valve 201 permits an equivalent output fluid pressure $Po$ to be maintained in the front and rear wheel brake assemblies in direct proportion, i.e., a 1:1 ratio, to the input fluid pressure $Pi$ until the predetermined input fluid pressure P is attained, as shown by the line OP. This predetermined input fluid pressure P is equivalent to the fluid pressure required to overcome the inherent resistance in the hydraulic system 200 and to move the brake shoes into initial engagement with the brake drums. When the predetermined input fluid pressure P is attained, the valve 231 is sealably engaged with the valve seat 224a, thereby preventing fluid communication between the inlet and outlet ports 208, 211 of the control valve 201 to thereafter effect the ratio change between input and output fluid pressure $Pi$ and $Po$; however, as the input fluid presure $Pi$ to the control valve 201 is increased, as shown by the line PL, the output fluid pressure $Po$ to the front wheel brakes remains substantially constant, as shown by the line PQ. Upon the input fluid pressure $Pi$ attaining the predetermined fluid pressure L, the force $F_1$ overcomes the force $F_2$ plus the additive compressive force $Fcr$ of the spring 219 and thereafter any increase in input fluir pressure $Pi$ to the control valve 201, as shown by line LR, will result in a proportionally greater increase in the output fluid pressure $Po$ to the front wheel brake assemblies 10, 11, as shown by the line QS in the ratio of the formula described hereinabove. Therefore, the rear wheel brake assemblies 17, 18 are additionally energized with respect to the fluid pressure $Pi$, as shown by the line LR, which is equivalent to the input fluid pressure $Pi$ to the control valve 201 and the front wheel brake assemblies 10, 11 are additionally energized by the proportionally larger fluid pressure $Po$, as shown by the line QS, so that the front wheel brake assemblies 10, 11 are capable of applying a greater braking force to counteract the inertia weight shift to the front of the automobile during a braking application.

From the foregoing, it is now apparent that a novel control valve meeting the objects set out hereinbefore is provided and that changes or modifications as to the precise configurations, shapes and details of the construction set forth in the disclosure by way of illustration may be made by those skilled in the art without departing from the spirit of the invention as defined by the claims which follow.

The embodiments of the invention in which an exclusive propery or privilege is claimed are defined as follows:

1. A ratio changing valve comprising a housing having a bore and counterbore therein, a pair of ports in said housing respectively connected with said bore and counterbore, a piston member having opposed ends slidable in said bore and counterbore, said opposed ends having differential effective areas respectively responsive to fluid pressure at said ports, a stepped bore in said piston member between said opposed ends thereof, a valve seat on said piston member in circumscribing relation with said stepped bore, stepped valve means slidable in said stepped bore, passage means in said valve means normally providing pressure fluid flow communication between said ports, said valve means also having opposed differential areas respectively responsive to fluid pressure at said ports, a sealing portion on said valve means for sealing engagement with said valve seat, resilient means engaged with said valve means and normally urging said sealing portion toward a position disengaged from said valve seat, said valve means being movable relative to said piston member in response to an established predetermined fluid pressure at said ports and acting on said valve means differential areas toward a position sealably engaging said sealing portion with said valve seat to interrupt pressure fluid flow communication through said passage means between said ports, and said valve means and piston member being thereafter concertly movable in response to increased fluid pressure at one of said ports in excess of a value predeterminately greater than the predetermined fluid pressure and acting on one of said differential areas of said valve means and said piston member to increase the fluid pressure at the other of said ports acting on the other of said differential areas of said valve means and said piston member in a predetermined ratio with that at said one port in excess of the value greater than the predetermined fluid pressure.

2. The ratio changing valve according to claim 1 comprising extension means on one of said piston member ends and having abutment means for displacement preventing engagement with said valve means.

3. The ratio changing valve according to claim 2 wherein said valve seat is provided on said one piston member end, said sealing portion including an annular valve head movable in said extension means between said abutment means and said one piston member end, and said resilient means normally urging said valve head toward a position engaged with said abutment means and spaced from said valve seat on said one piston member end.

4. The ratio changer according to claim 3 wherein said extension means includes an axially extending cylinder having one end connected with said one piston member end radially outwardly of said valve seat, said abutment means being provided on said cylinder adjacent to the other end thereof and said valve head being slidable in said cylinder, and other passage means extending radially through said cylinder adjacent to said one piston member to provide pressure fluid flow communication between said first named passage means and said one port when said valve head is disengaged from said valve seat.

5. The ratio changer according to claim 1 comprising an abutment on said housing, said other effective area of said piston member being larger than said one effective area thereof, the fluid pressure at said other port acting on said other effective area of said piston member to normally urge said piston member toward engagement with said abutment means until the fluid pressure at said one port acting on said one effective area of said piston member exceeds the value predeterminately greater than the predetermined fluid pressure.

6. The ratio changer according to claim 1 comprising an annular shoulder defined on said housing between said bore and counterbore, other resilient means in said counterbore normally urging said piston member into abutting engagement with said shoulder, said other effective area of said piston member being predeterminately larger than said one effective area thereof, and the fluid pressure at said other port acting on said piston member other effective area to also urge said piston member toward abutting engagement with said shoulder until the fluid pressure at said one port acting on said piston member one effective area exceeds the value predeterminately greater than the predetermined fluid pressure.

7. The ratio changing valve according to claim 1 comprising an expansible chamber in the larger portion of said stepped bore between said piston member and valve means, and means in said housing and said piston member defining a venting passage connecting said chamber with the atmosphere.

8. The ratio changer valve according to claim 1 including an undercut in said stepped bore, said valve seat being defined on a shoulder between said undercut and stepped bore, said passage means including an axial passage having one end in open pressure fluid communication with said one port and the other end thereof intersecting with a radial passage in open pressure fluid communication with said undercut, said sealing means being movable into engagement with said valve seat on said shoulder to interrupt pressure fluid flow communication between said ports.

9. A ratio changing valve comprising a housing having a bore and counterbore therein, inlet and outlet ports in said housing and respectively connected with said bore and counterbore, a stepped piston slidable in said bore and counterbore between said inlet and outlet ports, opposed inlet and outlet ends on said piston respectively responsive to fluid pressure at said inlet and outlet ports, said piston inlet end having an effective fluid pressure responsive area less than that of said piston outlet end, a stepped bore in said piston between said inlet and outlet ends thereof, a valve seat on said piston inlet end about said stepped bore, valve means including a stepped body portion slidable in said stepped bores and also having opposed inlet and outlet ends respectively responsive to fluid pressure at said inlet and outlet ports, said body portion inlet end having an effective fluid pressure responsive area greater than that of said body portion outlet end, a head portion connected with said body portion inlet end for sealing engagement with said valve seat, passage means in said body portion normally connecting said inlet and outlet ports in pressure fluid flow communication including an axially extending passage having one end intersecting with said body portion outlet end and the other end thereof intersecting with a radially extending passage in said body portion adjacent to said head portion, and resilient means engaged with said body portion and normally urging said head portion toward a position disengaged from said valve seat to provide pressure fluid flow communication through said passage means, said valve means being movable relative to said piston in response to a predeterminately applied fluid pressure at said inlet and outlet ports respectively acting on said body portion inlet and outlet end areas to engage said head portion with said valve seat and thereby close said passage means interrupting pressure fluid flow communication between said inlet and outlet ports, and said piston and said valve means being thereafter concertly movable in response to increased applied fluid pressure at said inlet port in excess of a value predeterminately greater than the predeterminately applied fluid pressure and acting on the respective inlet end areas thereof to increase the fluid pressure at said outlet port acting on the respective outlet end areas of said piston and valve means in a predetermined ratio with that applied at said inlet port in excess of the value predeterminately greater than the predeterminately applied fluid pressure.

10. A ratio changing valve comprising a housing having a bore and counterbore therein, inlet and outlet ports in said housing and respectively connected with said counterbore and bore, a stepped piston slidable in said counterbore and bore including opposed inlet and outlet ends respectively responsive to fluid pressure at said inlet and outlet ports, said piston inlet end having a fluid pressure responsive area greater than the fluid pressure responsive area of said opposed piston outlet end, stepped bores in said piston between said opposed inlet and outlet ends thereof, an undercut included in said stepped bores, a radial shoulder at the juncture of said stepped bore and said undercut, a valve seat on said radial shoulder about said stepped bore, stepped valve means for controlling pressure fluid communication between said inlet and outlet ports slidable in said stepped bore and extending into said undercut, opposed inlet and outlet ends on said valve means respectively responsive to fluid pressure at said inlet and outlet ports, said valve means inlet end having a fluid pressure responsive area greater than the fluid pressure responsive area of said opposed valve means outlet end, a seal on said valve means outlet end for engagement with said valve seat, passage means in said valve means connecting said inlet and outlet ports in pressure fluid communication including an axial passage having one end intersecting said valve means inlet end and the other end thereof intersecting with a radial passage in pressure fluid communication with said undercut and adjacent said valve means outlet end, resilient means within said piston stepped bore biased between said valve means and said piston and urging said valve means to a position normally disengaging said seal from said valve seat establishing pressure fluid communication between said inlet and outlet ports, abutment means in said piston stepped bore adjacent said piston inlet end for engagement with said valve means inlet end thereby limiting the movement of said valve means relative to said piston, said valve means being movable against said resilient means in response to a predetermined fluid pressure at said inlet and outlet ports respectively acting on said inlet and outlet fluid pressure responsive areas thereof to engage said seal with said valve seat thereby interrupting pressure fluid communication between said inlet and outlet ports and said piston and said valve means being thereafter concertly movable in response to applied fluid pressure in excess of the predetermined fluid pressure acting on the respective inlet fluid pressure responsive areas thereof to increase the fluid pressure at said outlet port acting on the respective outlet fluid pressure responsive areas thereof in a predetermined ratio with that applied fluid pressure at said inlet port.

No references cited.

SAMUEL LEVINE, *Primary Examiner.*